Dec. 9, 1969   D. C. PAULSON   3,483,288
METHOD OF MOLDING A THERMOPLASTIC ARTICLE TO OBTAIN
PREFERRED DIRECTIONAL PHYSICAL PROPERTIES
Filed May 5, 1967

INVENTOR.
Donald C. Paulson
BY
George A. Grove
ATTORNEY

United States Patent Office 3,483,288
Patented Dec. 9, 1969

3,483,288
METHOD OF MOLDING A THERMOPLASTIC ARTICLE TO OBTAIN PREFERRED DIRECTIONAL PHYSICAL PROPERTIES
Donald C. Paulson, Flint, Mich., assignor to General Motors Corporation, Detroit, Mich., a corporation of Delaware
Filed May 5, 1967, Ser. No. 636,328
Int. Cl. B29f 1/06
U.S. Cl. 264—328                    2 Claims

ABSTRACT OF THE DISCLOSURE

A thermoplastic resin article, at least a portion of which is elongated in configuration, is injection molded to obtain increased tensile strength in the longitudinal direction of the elongated portion by providing a two-part mold wherein the injected resin continues to flow even after the mold cavity is full and before the resin is completely solidified, thereby increasing the orientation of the resin polymer molecules in the direction of flow and effecting an increase in tensile strength.

---

This invention relates to the injection molding of thermoplastic synthetic insin articles and more particularly it relates to a method of injection molding an elongated article or an article at least a portion of which is elongated in configuration, to obtain a marked increase in tensile strength in the longitudinal direction of the elongated portion.

It is known that improved physical properties in a specific direction in a thermoplastic high molecular weight polymeric resin article can be obtained if a sufficient number of the molecules therein can be oriented in the given direction. In the past, this has been achieved for example, with extruded thermoplastic articles by subjecting the formed plastic to a tensile stress as it leaves the extrusion head. In this way, the polymer molecules in articles of extrudable configuration such as bars, rods, tubes and the like, are oriented in a longitudinal direction to obtain increased tensile strength. However, this technique alone is of limited value being applicable only to articles which can be extruded.

It is an object of the present invention to provide a method of injection molding an elongated article, or an article at least a portion of which is elongated in configuration, to obtain improved physical properties in the direction of elongation.

In accordance with my invention, these and other objects are accomplished in a preferred embodiment thereof by first providing a two-part mold which is suitable for conventional injection molding techniques. The mold defines a cavity in the configuration of the article or group of articles which are to be formed. It contains suitable sprue, runner and gate systems to permit the introduction of a molten thermoplastic resin into the mold cavity. To utilize the benefits of the present invention, however, at least a portion of the article to be molded must be elongated. In the portion of the mold cavity defining the elongated article or portion thereof, an exit gate and outlet passage is provided. This outlet passage is preferably smaller in cross section than the cross section of the cavity itself and is located at a point in the mold cavity which is remote from the inlet passage through which molten plastic is introduced into the mold cavity.

Preferably, the mold is designed and constructed so that the molten plastic enters the elongated section of the mold cavity at the opposite end from the outlet passage.

When the mold preparation has been completed, molten thermoplastic polymeric resin is injected into the mold cavity using conventional thermoplastic injection equipment. The molten plastic flows into the elongated cavity being cooled as it flows. However, even after the cavity is full, continued plastic flow occurs because a small amount of the plastic is forced into the outlet passage of the mold before complete solidification takes place. The entire process is accomplished in a very short period of time, usually in a matter of seconds. During this brief period of time, the continued flow of plastic in the elongated cavity increases the orientation of the polymer molecules in the direction of flow and thereby substantially increases the tensile strength of the molded article in the same direction.

In accordance with the invention, the entire mold cavity may be elongated as is required in the molding of rod or bar shaped articles, or alternatively, only a portion of the cavity need be elongated as may be required in the molding of articles of more complex design. In either case, a substantial increase in physical properties are obtained in the elongated portion of the thermoplastic article by the practice of my invention.

These and other objects will become more apparent from a detailed description of my invention which follows. Reference will be made to the drawings in which.

Figure 1:
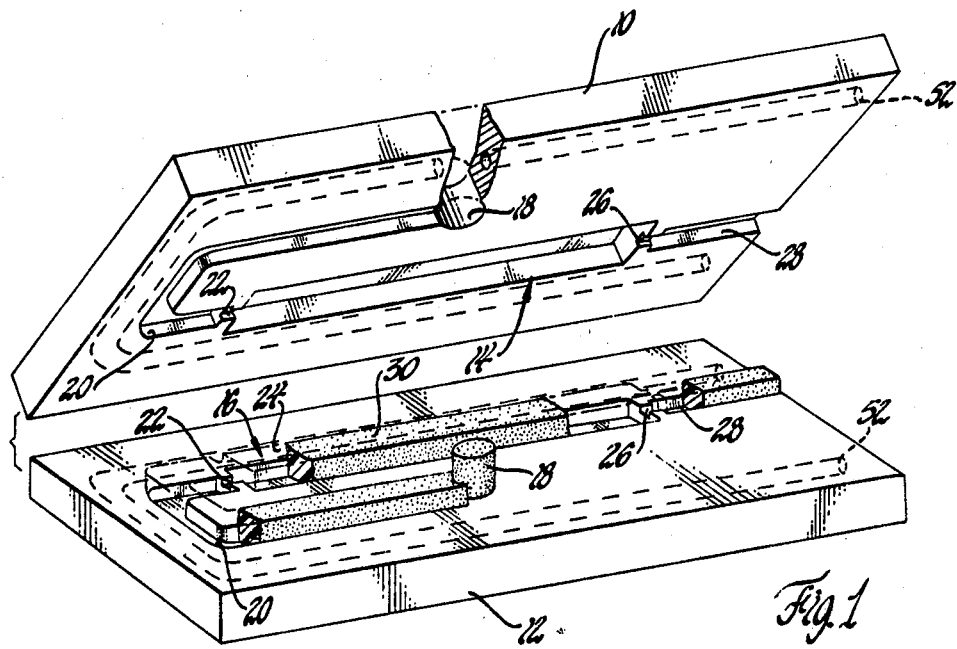
FIGURE 1 is an exploded perspective view of a two-part mold and elongated thermoplastic article formed therein.

In FIGURE 1 is shown a two-part mold having an upper member 10 and a lower member 12. These members are formed of steel or other strong metal suitable to withstand the high pressures of thermoplastic injection molding. The mold halves have been designed and constructed with recessed portions 14 and 16. When the mold members are in the closed position suitable for injection of molten thermoplastic resin, corresponding sections of the recessed mold portions 14 and 16 cooperate respectively to provide a sprue opening 18, a runner 20, an inlet gate 22, an elongated molding cavity 24, an outlet gate 26 and an outlet passage 28. For purposes of illustration, cavity 24 is in the shape of a bar. A thermoplastic bar 30 injection molded in accordance with the invention, partially broken away and in section, together with sprue, runner and gate portions is shown in the recessed section 16 of the lower mold member 12. It is noted that inlet gate 22 is located at one end of the elongated cavity 24. At the other end of elongated cavity 24 is situated the outlet gate 26 through which molten plastic flows under pressure from the cavity while it is being cooled until it has fully solidified. The principal distinction between the mold shown in FIGURE 1 and prior art devices is the provision of the outlet gate 26 and outlet passage 28 at one end of an elongated cavity to permit plastic flow from the cavity. It will also be noted that outlet gate 26 is coaxially aligned with elongated cavity 24 so that the plastic may flow from the cavity in the longitudinal direction thereof.

The mold is also provided with suitable cooling means such as air cooling or water ducts 52 which may be required depending upon the size of the mold and the rate at which molding cycles are to be repeated. When the mold has been prepared as described, it is closed with the two halves 10 and 12 being held together to withstand injection molding pressures. Molten thermoplastic synthetic resin is injected through the sprue 18, runner 20 and inlet gate system 22 into the elongated cavity 24. As the plastic enters the mold cavity it is cooled by contact with the mold which is maintained at a suitable temperature range below the solidification temperature of the molten plastic.

The cavity 24 is completely filled with plastic, but before complete solidification takes place a small portion of the plastic flows through exit gate 26 into outlet passage 28. Because of the continued flow of the plastic during cooling, preferred orientation of the polymer molecules in the direction of the flow is obtained. In prior art devices, once the cavity was full, plastic flow ceased and the polymer molecules tended to become arranged in a more random alignment. While for some purposes the random alignment is acceptable, there are many instances in which a greater than average tensile strength in a given direction would be preferred.

A thermoplastic bar ½" x ⅛" in cross section was injection molded from general purpose polystyrene in a mold like that depicted in FIGURE 1. Molten polystyrene at 400° F. was injected into the mold under a pressure of about 12,000 p.s.i. The mold was cooled with water at 70° F. The dimensions of the outlet gate were 0.040" x 0.040". A bar of the same size and shape was formed in a prior art mold similar to that of FIGURE 1 with the exception that no outlet passage was provided. The rod formed by prior art techniques was found to have a tensile strength of 5000 p.s.i. in the longitudinal direction, whereas a rod formed in accordance with the present invention had a longitudinal tensile strength of 10,000 p.s.i. The marked increase in directional properties can be utilized in many elongated devices such as springs, structural members, and the like wherein an increased strength in the longitudinal direction is desired.

In accordance with the invention, any polymeric thermoplastic resin such as acetal resins, polymethylmethacrylate resins, acrylonitrile-butadiene-styrene resins, polyamide resins, polycarbonate resins, polyethylene resins, polypropylene resins, polystyrene resins and polyvinyl-chloride for example, may be employed. The scope of the invention is limited by the polymeric composition only in that a thermoplastic resin is preferred. This is because the injection pressure, rate of cooling and location of the outlet passage can be controlled to provide the desired molecular orientation in a very short period of time before solidification is completed.

Figure 2:
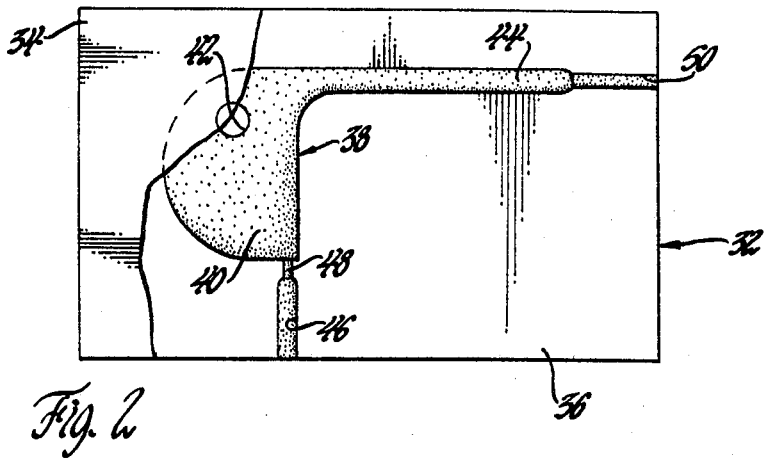
FIGURE 2 is a partly broken away plan view of a mold suitable for use in molding a differently shaped article in accordance with the invention wherein only a portion of the article to be injection molded is elongated.

In FIGURE 2 is depicted a plan view of a closed two-part mold 32 illustrating another embodiment of the invention. A portion of the uppermost mold member 34 is broken away to show the second mold member 36. Whereas in the embodiment depicted in FIGURE 1 the entire injection molded article was substantially elongated in configuration, it is to be understood that the benefits of the invention can be derived in the case of a thermoplastic article only a portion of which is elongated. An injection molded unitary article 38 having a cam portion 40, with a hole 42 therein, and spring portion 44 is shown in lower mold member 36. The mold 32 is provided with a runner 46 and inlet gate 48 for admitting thermoplastic resin to the mold cavity and an outlet passage 50 to permit limited flow of the plastic resin therefrom. It is preferred, in this embodiment, to inject the molten resin into that portion of the cavity which is not generally elongated (represented by the cam 40 in FIGURE 2). The molten resin must then flow through this portion of the cavity into one end of the elongated portion (represented by the spring member 44). Thus, it is necessary for the plastic to flow from one end of the elongated portion of the cavity to the other to completely fill it. Moreover, before complete solidification of the plastic takes place, continued limited flow of plastic occurs into the outlet pasage 50. This means that some preferred orientation of the polymer molecules, at least in the spring portion of the molded article, is obtained thereby increasing the strength in the longitudinal direction.

My method does not materially alter standard practice as far as suitable injection pressures and mold cooling rates are concerned. In the past, the mold cavity has always been completely filled with molten plastic before any substantial solidification has taken place. The injection pressure is maintained on the melt during the cooling. In the case of my invention however, a small amount of the molten plastic is permitted to flow through the outlet passage during solidification thereof to provide the desired longitudinal flow of the cooling material. The diameter of the outlet gate may be controlled so that it is less than the cross sectional area of the elongated portion of the mold cavity and so that it effectively restricts the amount of plastic that flows therethrough before solidification takes place. I have found that this offal or scrap plastic which enters the outlet passage can be kept to a very small amount, less than 10% of the weight of the article, and still achieve the desired increased direction properties described above.

While my invention has been described in terms of preferred embodiments, it is obvious that other forms may readily be adapted by one skilled in the art, and therefore the scope of my invention should be considered limited only by the following claims.

I claim:

1. A method of molding a thermoplastic synthetic polymeric resin comprising providing a two-part mold defining a cavity therein at least a portion of which cavity is elongated in shape, said mold having an inlet passage extending from an external surface thereof to said cavity, and an outlet passage coaxially aligned with and extending from said elongated portion of said cavity to an external surface of said mold, said outlet passage being remote from said inlet passage and smaller in cross section than said elongated cavity portion; injecting molten thermoplastic synthetic polymeric resin under pressure through said inlet passage into said mold which is maintained at a suitable temperature range below the solidification temperature of the molten resin, until said resin completely fills said cavity and subsequently flows into said outlet passage; continuing the flow of the resin in the elongated cavity and outlet passage just prior to complete solidification of said resin; opening said two-part mold and then removing the molded thermoplastic article therefrom; the injection pressure acting upon the plastic resin, the rate of cooling of the mold and the location of the outlet passage in said elongated cavity portion remote from said inlet passage all cooperating to effect continued flow of the plastic resin in said elongated portion of said cavity after said cavity is filled with resin prior to complete solidification of the resin.

2. A method of molding a thermoplastic synthetic polymeric resin comprising providing a two-part mold defining an elongated cavity therein, said mold having an inlet passage extending from an external surface thereof to one end of said elongated cavity, and an outlet passage coaxially aligned with and extending from the other end of said elongated cavity to an external surface of said mold, said outlet passage being smaller in cross section than said elongated cavity; injectnig molten thermoplastic synthetic polymeric resin under pressure through said inlet passage into said mold which is maintained at a suitable temperature range below the solidification temperature of the molten resin, until said resin completely fills said cavity and subsequently flows into said outlet passage; continuing the flow of the resin in the elongated cavity and outlet passage just prior to complete solidification of said resin; opening said two-part mold and then removing the molded thermoplastic article therefrom; the injection pressure acting upon said plastic resin, the rate of cooling of said mold and the location of the outlet passage at the opposite end of said elongated cavity from said inlet passage all cooperating to affect continued flow of the plastic resin in said elongated cavity after said cavity is filled with resin prior to complete solidification of said resin.

References Cited

UNITED STATES PATENTS

| | | | |
|---|---|---|---|
| 1,510,001 | 9/1924 | Gunning | 264—328 X |
| 2,182,400 | 12/1939 | Husted | 264—328 X |
| 2,453,739 | 11/1948 | Bates | 264—328 X |
| 2,541,592 | 2/1951 | Lietaert. | |
| 3,016,574 | 1/1962 | Fischer et al. | 264—328 X |
| 3,208,750 | 9/1965 | Firth et al. | 264—328 X |
| 3,265,797 | 8/1966 | Spaak et al. | |
| 3,285,404 | 11/1966 | Spinney. | |

OTHER REFERENCES

Staub, Effects of Basic Polymer Properties on Injection Molding Behavior, SPE Journal, April 1961, pps. 348–349.

Clark, Molecular Orientation in Injection Molding Acetal Homopolymer, SPE Journal, July 1967, pps. 46–49.

Severs, Rheology of Polymers, October 1962, pps. 126–127.

ROBERT F. WHITE, Primary Examiner

N. RUSHEFSKY, Assistant Examiner

U.S. Cl. X.R.

18—30, 34, 42D; 249—141